United States Patent
Kuo

(10) Patent No.: US 9,451,574 B2
(45) Date of Patent: Sep. 20, 2016

(54) METHOD OF MANAGING QUEUING OPERATION FOR A WIRELESS COMMUNICATIONS SYSTEM AND RELATED APPARATUS

(75) Inventor: Richard Lee-Chee Kuo, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 1076 days.

(21) Appl. No.: 12/121,810

(22) Filed: May 16, 2008

(65) Prior Publication Data
US 2008/0287126 A1 Nov. 20, 2008

Related U.S. Application Data

(60) Provisional application No. 60/938,708, filed on May 18, 2007.

(51) Int. Cl.
| | |
|---|---|
| *H04W 4/00* | (2009.01) |
| *H04W 60/04* | (2009.01) |
| *H04W 28/02* | (2009.01) |
| *H04W 48/08* | (2009.01) |
| *H04W 76/04* | (2009.01) |

(52) U.S. Cl.
CPC ............. *H04W 60/04* (2013.01); *H04W 28/02* (2013.01); *H04W 48/08* (2013.01); *H04W 76/04* (2013.01)

(58) Field of Classification Search
USPC ........ 455/422.1, 432.1, 450, 458; 370/395.1, 370/395.2, 395.21
See application file for complete search history.

(56) References Cited

U.S. PATENT DOCUMENTS

| | | | |
|---|---|---|---|
| 2003/0207702 A1 | 11/2003 | Chen | |
| 2004/0127243 A1* | 7/2004 | Sarkkinen | H04W 72/005 455/511 |
| 2005/0009527 A1* | 1/2005 | Sharma | H04W 28/06 455/445 |
| 2005/0070274 A1 | 3/2005 | Pedlar | |
| 2005/0169210 A1* | 8/2005 | Funnell | H04L 47/10 370/328 |
| 2007/0133479 A1* | 6/2007 | Montojo | H04W 52/0216 370/335 |
| 2007/0202835 A1* | 8/2007 | Son | H04W 52/0225 455/343.1 |
| 2008/0056198 A1* | 3/2008 | Charpentier | H04W 24/10 370/332 |

FOREIGN PATENT DOCUMENTS

| | | |
|---|---|---|
| JP | 2009510969 A | 3/2009 |
| KR | 1020040105257 A | 12/2004 |
| KR | 1020060026881 A | 3/2006 |
| KR | 100626968 B1 | 9/2006 |

(Continued)

OTHER PUBLICATIONS

3GPP TS 25.331 V7.4.0 (Mar. 2007) Radio Resource Control (RRC); Protocol Specification (Release 7), p. 159-p. 193.

(Continued)

*Primary Examiner* — Christopher M Brandt
*Assistant Examiner* — Matthew Genack
(74) *Attorney, Agent, or Firm* — Blue Capital Law Firm, P.C.

(57) ABSTRACT

A method of managing a queuing operation corresponding to a cell update procedure for a user equipment of a wireless communications system includes initiating the cell update procedure, entering a waiting state of the queuing operation according to a received response message corresponding to the cell update procedure, and re-initiating the cell update procedure during a waiting state of the queuing operation when an event triggering the cell update procedure occurs.

6 Claims, 4 Drawing Sheets

(56) References Cited

FOREIGN PATENT DOCUMENTS

| KR | 1020060121825 A | 11/2006 |
|---|---|---|
| KR | 1020080101807 A | 11/2008 |
| TW | 200402241 A | 2/2004 |
| TW | 200415930 A | 8/2004 |
| WO | 2006063310 A2 | 6/2006 |

OTHER PUBLICATIONS

3GPP, R2-072278 3GPP TSG-RAN WG2 Meeting #58, "Introduction of Wait time to Cell Update Confirm", May 2007.
ETSI: "Universal Mobile Telecommunications System (UMTS); Radio Ressource Control (RRC) protocol specification (3GPP TS 25.331 version 3.10.0 Release 1999)", ETSI TS 125 331 V3.10.0, Mar. 2002, pp. 133-136, XP002256492.
3GPP: "3rd Generation Partnership Project; Technical Specification Group Radio Access Network; Radio Resource Control (RRC); protocol specification (Release 7)", Mar. 2007, 3GPP TS 25.331 V7.4.0, paragraphs [8.6.6][8.6.6.1][8.6.6.2], XP002554537.
3GPP TS 25.331 V6.13.0 (Mar. 2007).
3GPP TSG-RAN WG2 Meeting #58, Kobe, Japan, May 7-11, 2007 (R2-072278).
3GPP TSG-RAN WG2 Meeting #58bis, Orlando, USA, Jun. 25-29, 2007 (R2-072365).
3GPP TSG RAN WG2 #59, Athens, Greece, Aug. 20-24, 2007 (R2-073812).
Office Action on corresponding CN patent application No. 200810100212.1 issued on Dec. 1, 2010.
Radio Resource Control (RRC) Protocol specification, 3GPP TS25.331 V7.4.0 (Mar. 2007), p. 159-p. 205.
Radio Resource Control (RRC) Protocol specification, 3GPP TS25.331 V7.4.0 (Mar. 2007), p. 325.
Office Action on corresponding JP patent application No. 2008-127552 issued on Jan. 18, 2011.
Office Action on corresponding JP patent application No. 2008-127554 issued on Jan. 18, 2011.
Office Action on corresponding TW Patent Application No. 97118192 dated Oct. 28, 2011.

* cited by examiner

METHOD OF MANAGING QUEUING OPERATION FOR A WIRELESS COMMUNICATIONS SYSTEM AND RELATED APPARATUS

CROSS REFERENCE TO RELATED APPLICATIONS

This application claims the benefit of U.S. Provisional Application No. 60/938,708, filed on May 18, 2007 and entitled "Method And Apparatus for Improving UE Waiting during Cell Update Procedure in a Wireless Communication System", the contents of which are incorporated herein by reference.

BACKGROUND OF THE INVENTION

1. Field of the Invention

The present invention relates to a method of managing a queuing operation for a wireless communications system and related communications device, and more particularly to a method of managing a queuing operation corresponding to a cell update procedure in a wireless communications system and related communications device.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates.

For the universal mobile telecommunications system (UMTS), the 3G communications system comprises User Equipment (UE), the UMTS Terrestrial Radio Access Network (UTRAN), and the Core Network (CN). Communications protocols utilized include Access Stratum (AS) and Non-Access Stratum (NAS). AS comprises various sublayers for different functions, including Radio Resource Control (RRC), Radio Link Control (RLC), Media Access Control (MAC), Packet Data Convergence Protocol (PDCP), and Broadcast/Multicast Control (BMC). The sublayers mentioned, and their operating principles, are well known in the art, and detailed description thereof is omitted.

RRC is a Layer 3 communications protocol, and is the core of the AS communications protocol. All radio resource information exchange, radio resource configuration control, QoS control, channel transmission format configuration control, packet segmentation/concatenation processing and control, and NAS protocol transmission processing is performed by the RRC layer. Between the user end and the network end, the RRC layer exchanges RRC Messages, also known as signaling, through RRC procedures. RRC Messages are formed from many Information Elements (IE) used for embedding necessary information for setting, changing, or releasing protocol entities of Layer 2 (RLC, MAC) and Layer 1 (Physical Layer), thereby establishing, adjusting, or canceling information exchange channels to perform data packet transportation.

According to the RRC protocol specification developed by the 3rd Generation Partnership Project (3GPP), the RRC procedures include a cell update procedure, which is initiated by the UE in response to certain events in UE e.g. uplink data transmission, paging response, or cell reselection. The RRC message exchange in the cell update procedure includes a CELL UPDATE message transmitted from the UE to the UTRAN, and a CELL UPDATE CONFIRM message transmitted from the UTRAN to the UE. According to content of the CELL UPDATE CONFIRM message, the UE performs radio bearer reconfiguration or release, mobile information update, or transport channel reconfiguration, etc.

During the cell update procedure, the UTRAN can utilize a queuing operation to queue the UE when the current serving frequency carrier is congested. Under the queuing operation, the UE is directed to another carrier for a certain time and re-initiates the cell update procedure. The related detailed operation is described as follows. After the UE transmits the CELL UPDATE message after the initiation of the cell update procedure, the UTRAN includes a "Frequency info" IE and a "wait time" IE in the CELL UPDATE CONFIRM message in response to the CELL UPDATE message for indicating the UE to perform the queuing operation. After receiving the CELL UPDATE CONFIRM message, the UE in CELL_PCH state selects a dedicated cell on the new carrier, whereas the UE in the URA_PCH state selects a cell belonging to the dedicated URA. After the cell selection, the UE waits at least the time given by the "wait time" IE, and then reinitiates the cell update procedure.

For a UE not in the queuing operation, a radio link failure, paging response, cell reselection, periodical cell update, an RLC unrecoverable error, and an uplink data transmission may trigger the cell update procedure. However, the prior art does not allow the UE to initiate the cell update procedure during the waiting state if any of the abovementioned events occurs.

When the queuing operation is performed, the UE may switch to another carrier not as congested as the current carrier, and enter the waiting state. There may be a terminating call for the UE during the period of waiting. Since the UE has been directed to the other carrier, the traffic on this carrier is possibly not so congested when the terminating call occurs. Therefore, the carrier should be capable of handling the terminating call for the UE. According to the related specification, the UTRAN accordingly transmits the paging information related to the terminating call to the UE, but the UE cannot respond to the terminating call until the UE leaves the waiting state. Furthermore, the maximum period of the waiting time is 15 seconds. In this situation, the UE may miss the terminating call, since the call connection is delayed.

SUMMARY OF THE INVENTION

The present invention therefore provides a method of managing a queuing operation corresponding to a cell update procedure for a UE of a wireless communications system and related communications device that can avoid missing the terminating call.

The present invention discloses a method of managing a queuing operation corresponding to a cell update procedure for a UE of a wireless communications system. The method includes initiating the cell update procedure, entering a waiting state of the queuing operation according to a received response message of the cell update procedure, and reinitiating the cell update procedure during a period of the waiting state when an event triggering the cell update procedure occurs.

The present invention further discloses a communications device in of a wireless communications system for managing a queuing operation corresponding to a cell update procedure to avoid missing the terminating call. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes initiating the cell update procedure, entering a waiting state of the queuing operation according to a received response message of the cell update procedure, and reinitiating the cell update procedure during a period of the waiting state when an event triggering the cell update procedure occurs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
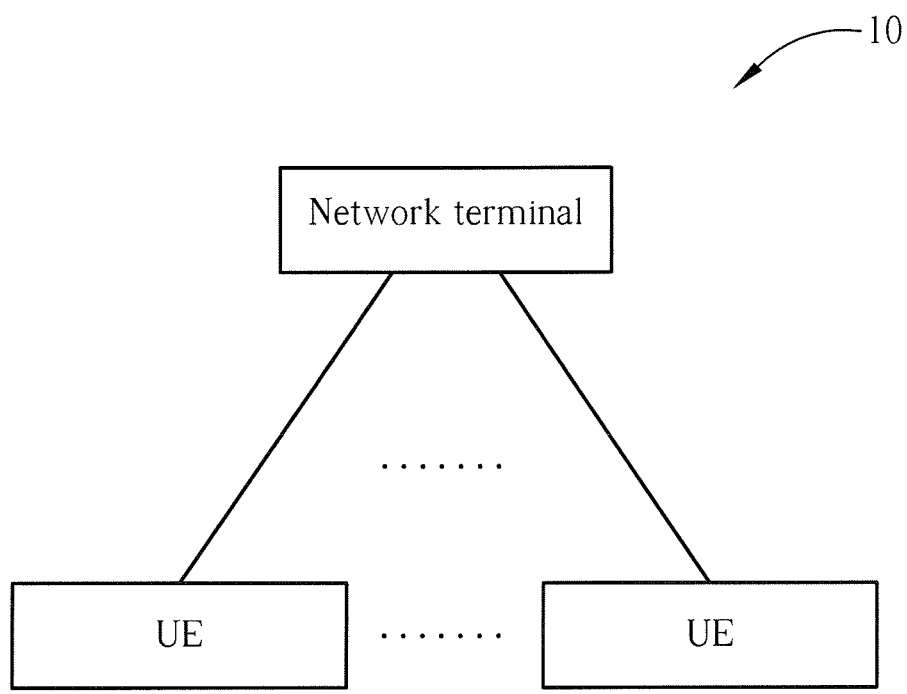
FIG. 1 is a schematic diagram of a wireless communications system.

Please refer to FIG. 1, which is a schematic diagram of a wireless communications system 10. The wireless communications system 10 is preferred to be a third generation (3G) mobile communications system, and is briefly formed with a network terminal and a plurality of user equipments. In FIG. 1, the network terminal and the user equipments are simply utilized for illustrating the structure of the wireless communications system 10. Practically, the network terminal may include a plurality of base stations, radio network controllers, and so on according to actual demands, and the user equipments (UEs) can be apparatuses such as mobile phones, computer systems, etc.

Figure 2:
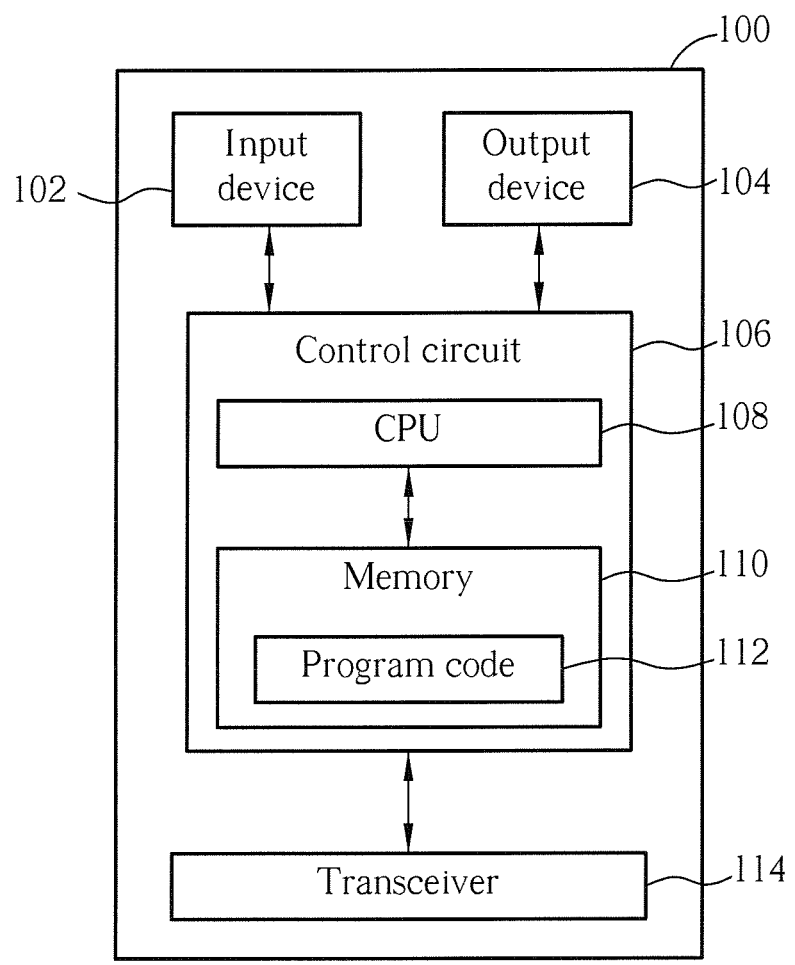
FIG. 2 is a functional block diagram of a communications device.

Please refer to FIG. 2, which is a functional block diagram of a communications device 100. The communications device 100 can be utilized for realizing the UEs in FIG. 1. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
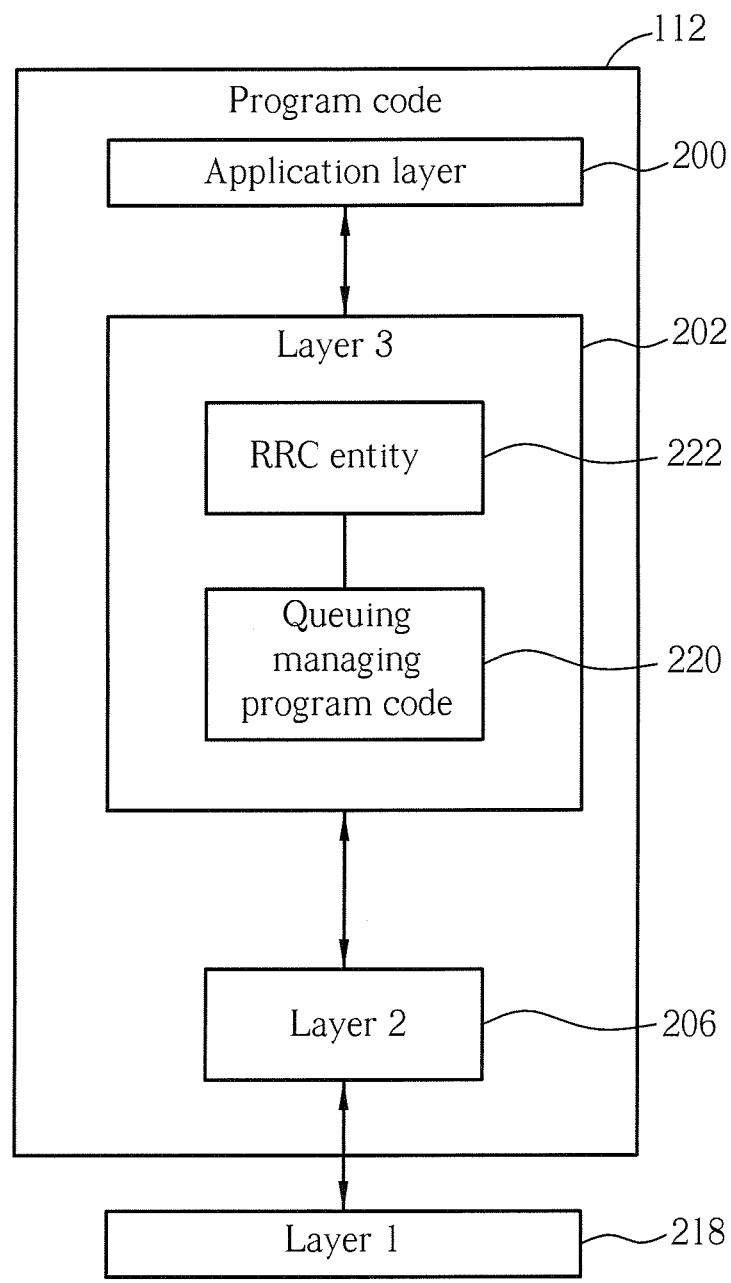
FIG. 3 is a diagram of the program code shown in FIG. 2.

Please continue to refer to FIG. 3. FIG. 3 is a diagram of the program code 112 shown in FIG. 2. The program code 112 includes an application layer 200, a Layer 3 202, and a Layer 2 206, and is coupled to a Layer 1 218. The Layer 3 202 includes a radio resource control (RRC) entity 222 for controlling the Layer 1 218 and the Layer 2 206 with RRC messages and information elements (IEs) and thereby exchanging signaling with the network terminal of the wireless communications system 10 through RRC procedures. Furthermore, the RRC entity 222 can change an RRC state of the communications device 100, switching among an Idle mode, a CELL_PCH, a URA_PCH, a CELL_FACH or a CELL_DCH state.

Figure 4:
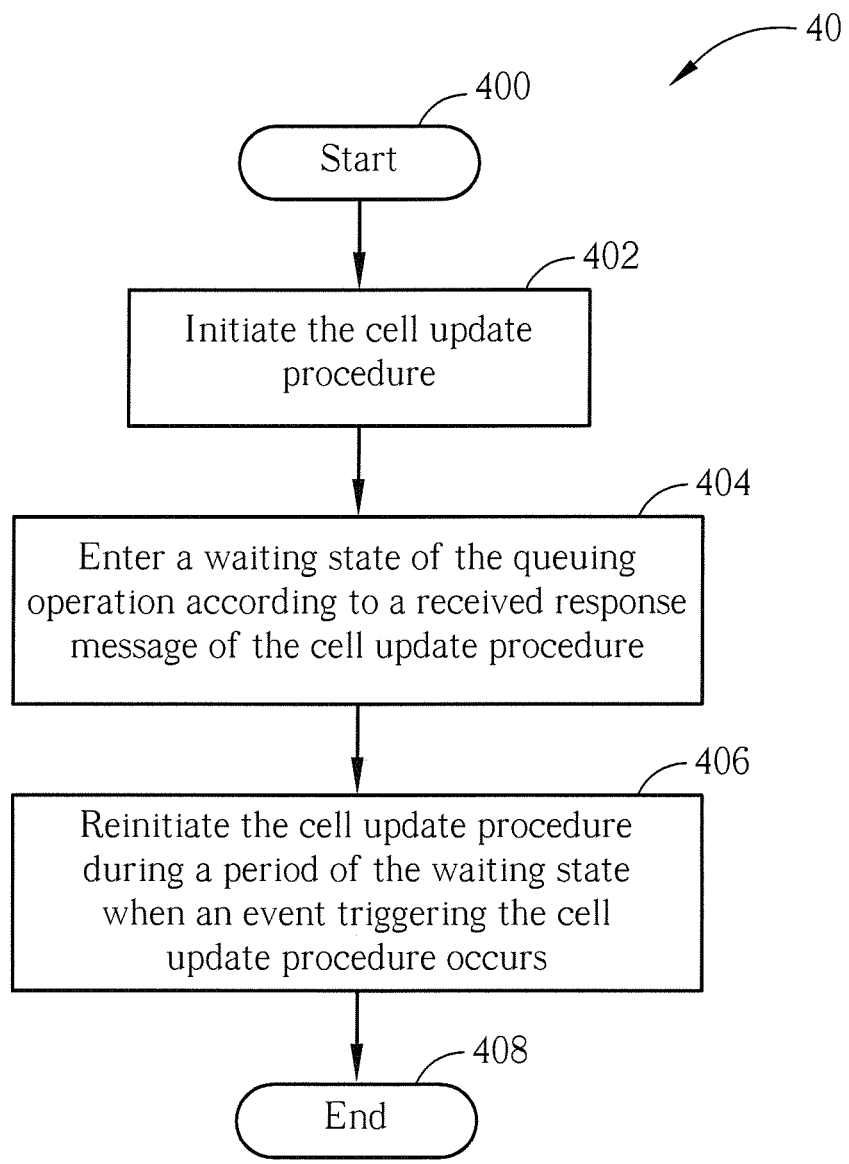
FIG. 4 is a flowchart diagram of a process according to an embodiment of the present invention.

When the communications device 100 initiates a cell update procedure, the network terminal queues the communications device 100 at another frequency carrier if the current serving frequency carrier is congested. The embodiment of the present invention provides queuing managing program code 220 for the queuing operation to avoid a delay of response to important paging information, such as paging information related to a terminating call. Please refer to FIG. 4, which illustrates a schematic diagram of a process 40 according to an embodiment of the present invention. The process 40 is utilized to transmit paging information for a network terminal of the wireless communications system 10, and can be compiled into the queuing managing program code 220. The process 40 includes the following steps:

Step 400: Start.

Step 402: Initiate the cell update procedure.

Step 404: Enter a waiting state of the queuing operation according to a received response message of the cell update procedure.

Step 406: Reinitiate the cell update procedure during a period of the waiting state when an event triggering the cell update procedure occurs.

Step 408: End.

According to the process 40, the UE enters the waiting state according to the received response message of the cell update procedure after the cell update procedure is initiated, and then reinitiates the cell update procedure during the period of the waiting state when the event triggering the cell update procedure occurs. Preferably, the response message is a CELL UPDATE CONFIRM message from the UTRAN, and thereby the UE enters the waiting state if the CELL UPDATE CONFIRM message includes a wait time IE. The event triggering the cell update procedure is preferably a paging response.

In addition, the UE stops a timer used for counting a waiting time during which the UE needs to stay in the waiting state before the cell update procedure is reinitiated.

As can be seen from the above description, the UE switches from the current carrier to another carrier. If the network terminal pages the UE due to a terminating call, the UE on the new carrier can, through the process 40, immediately reinitiate the cell update procedure to respond to the related paging information. As a result, the call connection will not be delayed.

In conclusion, the present invention allows the UE in the waiting state to reinitiate the cell update procedure, so as to avoid missing the terminating call.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a cell update procedure for a user equipment (UE) of a wireless communications system, the method comprising:

the UE initiating the cell update procedure;

the UE entering a waiting state of a queuing operation when a received response message of the cell update procedure includes a wait time information element which defines a waiting time for the UE to stay in the waiting state, the queuing operation comprising queuing the user equipment in an RRC state of CELL_PCH or URA_PCH;

the UE reinitiating the cell update procedure during a period of the waiting state of the queuing operation when an event of a paging response occurs;

the UE reinitiating the cell update procedure when the period of the waiting state of the queuing operation ends; and the UE stopping a timer used for counting the waiting time during which the UE needs to stay in the waiting state before the cell update procedure is reinitiated.

2. The method of claim 1, wherein the UE transmits a CELL UPDATE message to a Universal Terrestrial Radio Access Network (UTRAN) when initiating the cell update procedure.

3. The method of claim 1, wherein the received response message of the cell update procedure is a CELL UPDATE CONFIRM message.

4. A communications device of a wireless communications system for a cell update procedure, the communications device comprising:

a control circuit for realizing functions of the communications device;

a central processing unit coupled to the control circuit for executing a program code to operate the control circuit; and a memory coupled to the central processing unit for storing the program code;

wherein the program code comprises:

initiating, at a user equipment (UE), the cell update procedure;

entering, at the UE, a waiting state of a queuing operation when a received response message of the cell update procedure includes a wait time information element which defines a waiting time for the UE to stay in the waiting state, the queuing operation comprising queuing the user equipment in an RRC state of CELL_PCH or URA_PCH;

reinitiating, at the UE, the cell update procedure during a period of the waiting state of the queuing operation when an event of a paging response occurs;

reinitiating, at the UE, the cell update procedure when the period of the waiting state of the queuing operation ends; and stopping a timer used for counting the waiting time during which the UE needs to stay in the waiting state before the cell update procedure is reinitiated.

5. The communications device of claim 4, wherein the program code further comprises:

transmitting a CELL UPDATE message to a Universal Terrestrial Radio Access Network (UTRAN) when initiating the cell update procedure.

6. The communications device of claim 4, wherein the received response message of the cell update procedure is a CELL UPDATE CONFIRM message.

* * * * *